United States Patent [19]
Tschirky et al.

[11] 3,912,425
[45] Oct. 14, 1975

[54] WEAR SLEEVES FOR SEALED BEARINGS

[75] Inventors: John E. Tschirky; Gary Monroe Crase, both of Long Beach, Calif.

[73] Assignee: Smith International, Inc., Newport Beach, Calif.

[22] Filed: Jan. 14, 1974

[21] Appl. No.: 433,284

Related U.S. Application Data

[63] Continuation-in-part of Ser. No. 388,586, Aug. 15, 1973, Pat. No. 3,879,094.

[52] U.S. Cl. ................................. 418/48; 175/107
[51] Int. Cl.² .......................................... F04C 1/06
[58] Field of Search ......... 418/48; 175/107; 277/30; 308/26, 4 A

[56] References Cited
UNITED STATES PATENTS

| | | | |
|---|---|---|---|
| 1,861,815 | 6/1932 | Radford | 308/4 A |
| 2,990,894 | 7/1961 | Mitchell et al. | 175/107 |
| 3,260,318 | 7/1966 | Neilson et al. | 175/107 |
| 3,807,513 | 4/1974 | Kern et al. | 175/107 |

*Primary Examiner*—C. J. Husar
*Assistant Examiner*—O. T. Sessions

[57] ABSTRACT

This invention relates to wear sleeves for sealed bearings.

12 Claims, 5 Drawing Figures

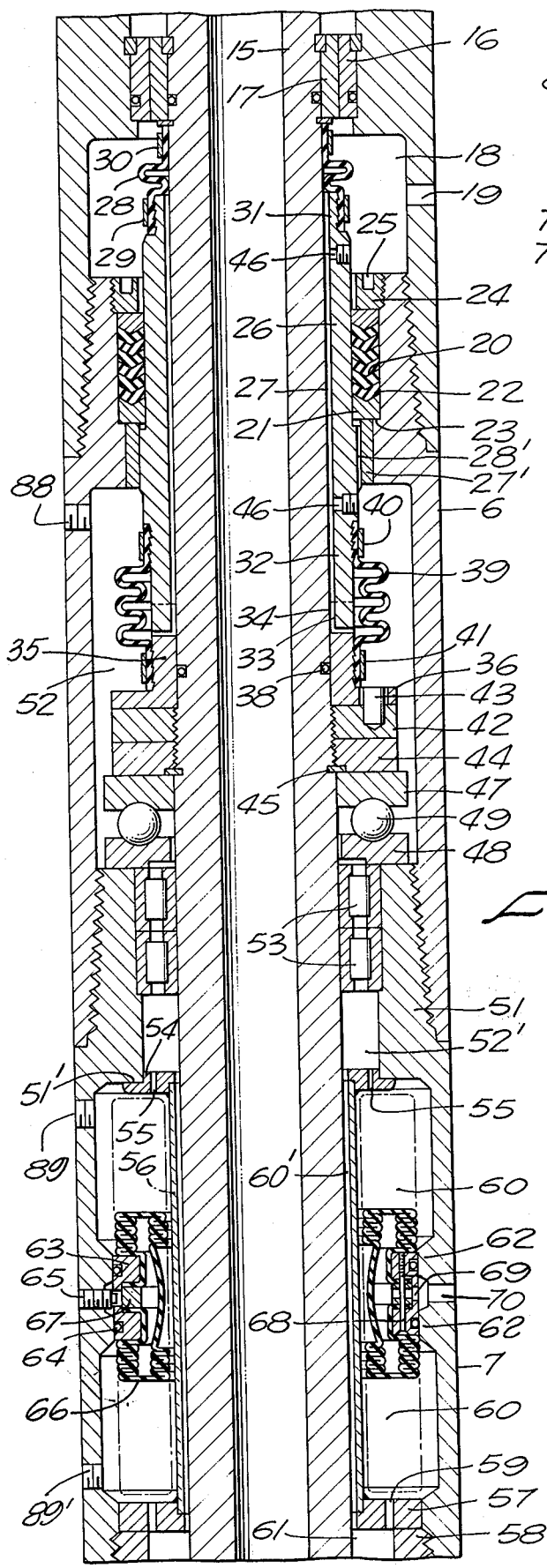
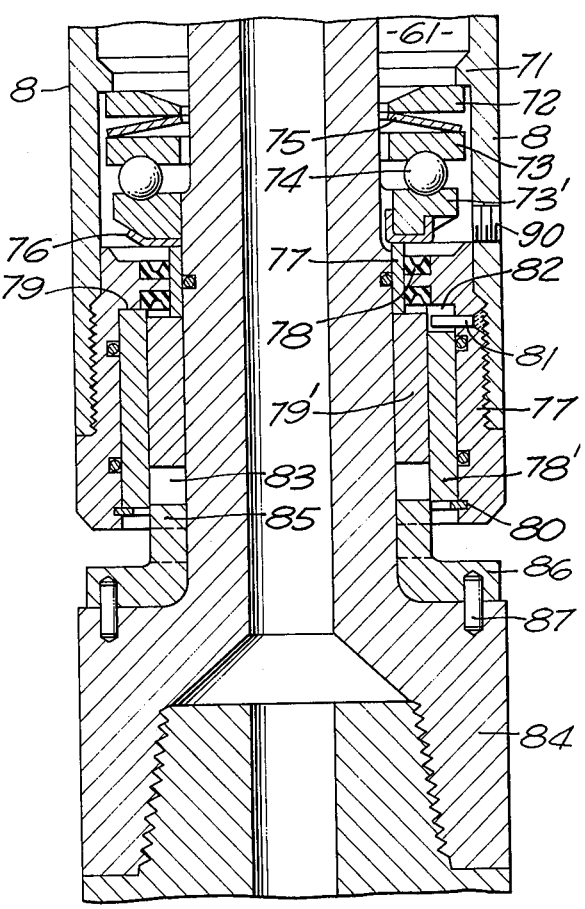
Fig.2.
Fig.3.
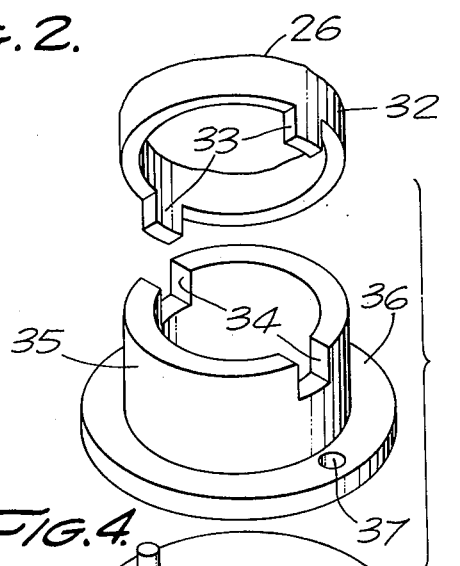
Fig.4.

WEAR SLEEVES FOR SEALED BEARINGS

This is a continuation-in-part of application Ser. No. 388,586, filed Aug. 15, 1973, now U.S. Pat. No. 3,879,094.

This invention relates to seals for bearing-supported rotary shafts and provides replaceable wear elements to protect the shafts and to maintain seal integrity. The design of the seal and wear element is such that the integrity of the seal is not affected by any transverse deflection of the shaft which could reduce the seal pressure on any surface of the rotating member so as to impair the seal at that surface.

The seal system of our invention is to mount the wear sleeve on either the shaft or the shaft housing, and preferably on the shaft so as to create a seal between that end and the shaft and the member on which it is mounted. The wear sleeve is spaced from and is flexibly supported by the member on which it is mounted. A seal is mounted between the other member and the adjacent surface of the wear sleeve.

Since the wear sleeve is mounted so that the shaft can deflect either under load or due to bearing clearances or wear without introducing any substantial angular deflection of the wear sleeve, the seal at the surface of the wear sleeve is unaffected and the integrity of the seal is maintained.

Space between the sleeve and the member on which it is mounted is sealed from the annular space between the shaft and the said member so that no fluid present in the annulus can enter between the wear sleeve and the member on which it is mounted. This is particularly important where the environment, in which the wear sleeve is to operate, contains solids suspended in a fluid which could deposit in the space between the sleeve and the number on which it is mounted. For example, where the wear sleeve is used in connection with bearings employed in pumps which pump mud, cement, or other slurries or, in the case of fluid motors where the fluid used to operate fluid turbines or progressive cavity motors as described herein, our invention will ensure that the solids will not get between the sleeve and its support and yet will be free to be displaced with respect to the rotating member mounted in the bearings.

We may, however, particularly when the nature of the fluid at the seal permits, or the pressure differential across the packing gland is moderate, employ a flexible connection which seals the upper end only of the wear sleeve, where the other wear sleeve extends beyond the packing gland so that the space between the shaft and the wear sleeve is sealed at one end of the flexible boot and at the other end by the packing gland.

These and other objects of our invention will be understood by reference to the drawings, of which FIG. 1 is a somewhat schematic showing of one application of our invention;

FIG. 2 is an upper fragmentary section of the assembly taken on line 2—2 of FIG. 1;

FIG. 3 is a lower fragmentary section taken on line 2—2 of FIG. 1;

FIG. 4 is a perspective view of a detail of FIGS. 2 and 3;

The following description of our invention is directed to our presently preferred embodiment and application of our invention. It will be understood that the wear sleeve and seal may be applied to any rotating element where it is desired to introduce a barrier to a fluid under pressure on one side of the seal. The particular application of our invention is described herein as applied to an in-hole drill described and claimed in the copending application Ser. No. 388,586.

Figure 1:
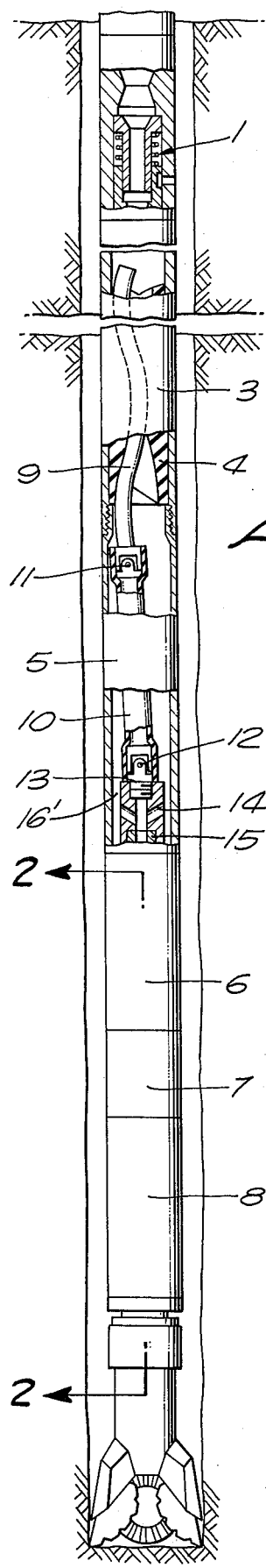

The motor shown in FIG. 1 is a progressing cavity motor. The motor housing 3 (see FIG. 1) is connected to the by-pass assembly 1. The motor housing 3 carries a stator 4 bonded to the interior surface of the housing 3. The connecting rod assembly housing 5 is connected to the housing 3 and to the bearing housing 7 and 8. The drive shaft assembly housing 6, 7, and 8 carry the seals and bearing assemblies. The housing 6 is connected by a pin and box connection to the housing 5 and to the housing 7. The housing 7 is connected to the lower drive shaft bearing assembly housing 8, all to be more fully described below.

The rotor 9, mounted inside the stator 4, at its lower end is connected to the connecting rod 10 by a universal joint 11 and to the tubular drive shaft 15 through the drive shaft cap 13 connected to the connecting rod by a like universal joint 12.

The universal joint may be one such as described in the Neilson et al. U.S. Pat. No. 3,260,318, patented July 12, 1966, or in the Neilson et al. U.S. Pat. No. 3,260,069, patented July 11, 1966.

The connecting rod and universal joints may be enclosed in a flexible cover to protect them from erosion by the mud, and to contain the lubricant inside the connecting rod assembly.

The progressing cavity motor shown is of the helicoidal type. The outer body of the motor, that is, the stator, is composed of an elastomer, for example, a rubberlike compound, which creates a spiral cavity throughout its length to provide a double spiral groove. The passage of fluid through the stator 4 and past the rotor along its length causes a rotation of the rotor and a movement of the rotor from side to side creating an eccentric rotation at the end of the rotor where it is connected to the connecting rod. Because of the universal joints, the eccentric motion is converted into a true rotary motion (concentric) at the drive shaft 15. The fluid as it exits the stator passes through the connecting rod housing 5, around the connecting rod and drive shaft cap 13 through by-pass annulus 16'. The drive shaft is provided with orifices 14. At this point, the mud is under very high pressure and passes in considerable volume and pressure from the exit of the stator.

For example, and not as a limitation of our invention, the required pressure at the exit of the stator may be, depending on the depth of the bore hole, in the order of 500 to 1500 pounds per square inch. This is the differential pressure at the bit nozzle. Such pressures are required in order to have the required velocity and fluid volume rate through the bit nozzles in order that there will be the necessary pressure and volume of fluid at the bottom of the hole for better hydraulic and bit cutting action, and to return the cuttings to the surface.

In order to protect the bearings, we provide a barrier seal between the bearings and the stator outlet. In order to protect the shaft, we provide a wear sleeve.

A radial bearing is provided between the stator outlet and the seal and bearing assemblies. We may use any type of radial bearing but prefer to employ the metallic radial bearing flow restrictor assembly disclosed in our copending application Ser. No. 388,586, now U.S. Pat. No. 3,879,094 filed Aug. 15, 1973, which is hereby incorporated in this application by this reference or rubber bearings as shown in the Garrison U.S. Pat. No. 3,456,476.

Such radial assemblies are composed of a sleeve 16 mounted on the housing 6. The complementary bearing member consists of a sleeve 17 mounted on the shaft 15. One or the other of the sleeves may contain circumferentially spaced grooves along its length.

If the radial bearings carry passageways, which passageways communicate with the annulus if desired, the space 18 may be vented to the exterior of the housing at vent 19. Where this is not desirable, the vent may be omitted.

The packing gland 20 of the seal assembly is composed of a plurality of superposed metallic rings 21 and fibrous Chevron seals member 22 held between the rings. The seal assembly is seated on an internal shoulder 23 of the housing 6. The rings 21 are of an internal diameter greater than the internal diameter of the seals 22. The internal nut 24 carrying wrench bores 25 is screwed down to compress Chevron seals tightly between the rings 23.

The wear sleeve 26, which extends the length of the packing gland and extends beyond the gland at each end, is spaced at 27 from the outer surface of the tubular drive shaft 15. The Chevron packing abuts the external surface of the floating wear sleeve 26 which extends beyond the ends of the packing gland.

The wear sleeve 26 is mounted at one end of the sleeve 26 on the shaft 15 by means of a flexible boot 28 which extends circumambiently about the shaft 15 and has both transverse and axial extensibility. This is accomplished by using a corrugated sleeve which is clamped to the end 31 of the sleeve 26 by circular clamp 29 and to the shaft 15 by clamp 30. The boot forms a cylindrical enclosing seal at the end 31. The boot may be made of any flexible material, such as rubber and corrugated to permit longitudinal and transverse relative movement between the end 31 and the shaft 15. The other end 32 of the sleeve 26 is formed with two dogs 33 which enter notches 34 in the driver fitting 37 carrying the flange 36 provided with bores 37 and sealed by 0 ring seals 38.

The boot 39 of design similar to 28 is clamped to the end 32 of the sleeve 26 by clamp 40 and is clamped to the drum 35 by clamp 41. The boot 39 made of the flexible corrugated material as in the case of the boot 28 forms a circumferential seal about the end 32. The boot 28 and boot 39 thus form an enclosrue between the shaft and the wear sleeve, the flexible boot permitting the relative axial and transverse displacement of the shaft 15 and sleeve 26.

The bushing 27' which may be of any suitable metal is mounted between the housing and the shaft in order to hold the wear sleeve 26 concentric with the housing and seal 20. The bushing is suitably grooved at 28' along its length to permit packing with suitable lubricant. The relative motion between the shaft and the wear sleeve places no inordinate transverse pressure against the packing. Such relative motion may occur due to transverse loading should the span between the supporting bearings be large. Also, machinery and assembly tolerances or wear at the bearings will cause the shaft to whip where transverse loading on the shaft results from such loads imposed on the shaft.

The ring nut 42 carrying pins 43 which fit into bores 37 is threaded onto the shaft 15 to lock nut 44 into position on the retaining ring 45 positioned in a receiving groove on the shaft 15.

The sleeve 26 is mounted at its end in an interlock with the shaft 15 for rotation with the shaft 15, by the dogs 33 which enter in notches 34 in the drum 35. The space between the sleeve and the shaft and the internal volume of the boots may be filled with lubricant through fittings 46. The above results in transverse adjustability to hold a good seal at ring 31 and the Chevron packing. This is maintained notwithstanding the whip of the drive shaft as a result of unbalanced transverse loading communicated from the random loading of the drive shaft as, for example, by the drill bit. As will be described below, the seal against the sleeve 26 is maintained during the movement of the sleeve relative to the gland 20, when the drive shaft is moved axially with respect of the housing, since the flexible Chevron seal rings 22 remain in sealing contact with the sleeve 26.

The upper bearing assembly is composed of the races 47 and 48 and balls 49. The race 47 in the position shown in the drawings carries the weight of the rotor and connecting rod, shaft and bit, the load of the housings being off the bit as is more fully described below.

A radial bearing 53 is provided adjacent the upper thrust bearing.

The lubricator housing 7 is connected via pin 51 to the box end of the housing 6 providing an annular space 52' beneath the thrust bearing 49 which communicates between the radial bearings 53 and the free space about the upper bearing assembly. The free space above the bearing assembly includes the clearance between the housing 6 and the boot 39 beneath the gland 20. Space 52' is connected to space 61 through annulus 60'.

Below the pin 51, the housing 7 has an enlarged internal diameter providing a space 60 underneath the internal shoulder 51' against which is seated a plate 54 carrying bores 55. A sleeve 56 is welded to plate 54. A lower plate 57 is positioned on the top of the pin 58 of the lower bearing housing 8 and carries bores 59. The sleeve 56 is connected to plate 57. The sleeve 56 is spaced from the drive shaft 15 forming an enclosure 60 which communicates through the bores 59 with the annulus 61 between the housing 8 and the drive shaft 15. Communication is also provided from the space 61 around the lower bearing as described below.

Positioned in the internal wall of the housing 7, intermediate between the plates 55 and 57 are circular bosses 62. The bellows ring 63 sealed against the internal wall of the bosses 62 by the 0 rings 64 is held in position by a series of spaced set screws 65 circumferentially positioned about the housing 7 and flush with the outer surface thereof.

The bellows 66 is held in the ring 63 by the wedge ring 67 and secured by a plurality of circumferential spaced screws 68. The ring 67 is bored at 69 to provide a communication with 70 positioned in the housing 7 and in registry with the bore 69. The bellows assembly 66 including the ring 63 is a commercial item available on the general market and needs no further description. The bellows assembly is modified by provision of the bore hole 69 and the seats for the screws 65. Any bellows or bag or any other expandable container that will function in a similar manner will be suitable for the purposes of our invention. However, a bellows employed in the herein combination, which communicates with the exterior of the housing, has a particular useful function in the combination with the bearings assembly and seal assembly described above as will be more fully set forth below.

The housing 8 below the pin 58 is of enlarged diameter ending in a beveled shoulder 71 against which is positioned the load plate 72. The races 73, 73' and balls 74 form a bearing assembly. The Belleville spring washer 75 positioned between the load plate 72 and race 73 spring loads the bearing. This assembly is supported on the retaining ring 76 positioned on the drive shaft 15.

The spacer sleeve 77 sealed by an 0 ring is positioned on the drive shaft 15 and abuts underneath the retaining ring 76. The radial bearing housing 77' carries radial bearing sleeve 78' against the inner surface of the end flange 79. The complimentary bearing sleeve 79' seats against the spacer sleeve 77. The two concentric and contiguous cylinders 78' and 79' formed of hard materials such as tungsten carbide or other material similar to the radial bearings 16, 17 are positioned in the assembly 77' to form a radial bearing 78' and 79'. The outer cylinder 78' if of metal is sealed against the inner surface of 77' by 0 rings, and seal cups 78 are held in position by bearing housing 77'. Radial bearing sleeve 78' is held in position by bearing housing 77', retaining ring 80, and kept from rotation by pin 81, which enters the notch 82 in 78'.

The complimentary bearing sleeve 79' is mounted on the surface of the drive shaft 15 to be positioned underneath the spacer 77. The end of the sleeve 79' carries notches 83.

The tungsten carbide cylinders are polished and form a sliding fit. The sleeve 79' is locked to the shaft.

The drill bit box 84 is formed integrally with the drive shaft 15 at the end thereof. The box carries an adapter 86 which has dogs 85 diametrically arranged to fit into the notches 83. Adapter 86 is located on the shoulder of the drill bit box by pins 87 positioned in the box 84 and by entry into the bores in 86.

The assembly as shown in FIGS. 2 and 3 shows the parts with a load on the upper bearing as if the weight of the drill string was off the bit and on the upper bearing as shown.

As will be noted, housing 6 has a tapped hole sealed by plug 88 adjacent to the boot 39. Housing 7 has tapped holes sealed by plugs 89 and 89', and housing 8 has a tapped hole sealed by plug 90, beneath the lower bearing. The free spaces below the gland 20, and in 52, 60 and between 60 and the seals 78 may be filled with lubricant through these ports.

Figure 5:
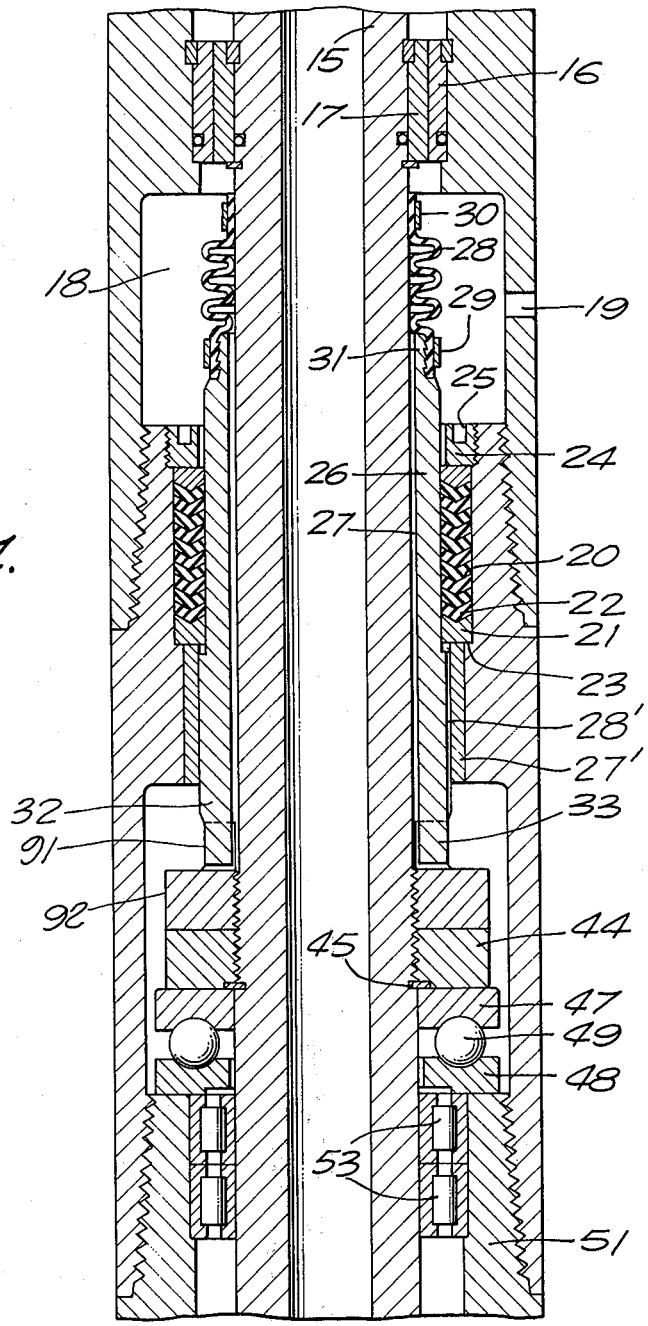
FIG. 5 is a modification of FIG. 2.

FIG. 5 shows a modification on the form shown in FIGS. 2—4, in which all parts which are the same as in FIGS. 2—4 bear the same numbers. Reference is made to the description of the structure and function of the parts with respect to FIGS. 2—4.

The difference is in the manner of sealing the space between the shaft and the wear sleevve from the fluid present in space 18 and below the packing gland 20.

Only one boot 28, such as in FIG. 2, is provided at the upper end of the wear sleeve 26 which is clamped to the shaft 15 by clamp 30 as in FIG. 2. The lower end 32 carries the dogs 33 which enter the notched ring 91 formed integrally with 92. Except for the omission of the boot 39 and the above variations, the form in FIG. 5 is the same as in FIGS. 2—4.

It will be observed that the space 27 between the shaft and the wear sleeve at the upper end of the space is sealed from the fluid in 18 above the gland 20 by the boot 28. The space 27 at the lower end 32 is sealed from 18 by the packing gland 20.

If the vent 19 is employed in either form (see FIGS. 2 and 5), the bore hole pressure at the vent 19 and at the bore 70 and at the end of the housing 77' is substantially the same and the mud pressure differential across the gland 20 is thus substantially zero. The packing gland 20 and the seal 78 are thus required to hold only a small pressure differential. Mud is thus kept out of the bearings.

When the bit is raised off bottom, the drilll string and housings are raised by the drilling lines from which they are suspended and the rotor, connecting rod, drive shaft and drill bit move downward with respect of the housings as in FIG. 2.

The weight of the drill string and housings if off the lower thrust bearing assembly. However, the Belleville spring 75 is in sufficient compression to hold the races against the balls.

When weight is to be placed on the bit, the drill pipe and housing 5, 6, 7, and 8 are lowered with respect of the shaft and load is transferred from the upper thrust bearing assembly to the lower thrust bearings.

During the displacement of housings relative to the shaft in both directions, the wear sleeve 26 moves axially over the gland members 20. The relative axial length of the packing gland 20 and the sleeve 26 are such that the length of the sleeve 26 is greater than the axial extent of the packing gland. The packing gland remains in sealing relation to the wear sleeve during the relative axial displacement of the wear sleeve and packing gland.

The seal at the boots, together with the lubricant introduced through 46, prevents the entrance of mud which otherwise would pack between the sleeve and the shaft so as to impair the relative displacement of the shaft and the wear sleeve 26.

The aforesaid application Ser. No. 388,586, now U.S. Pat. No. 3,879,094 filed Aug. 15, 1973 is herewith incorporated by this reference.

We claim:

1. A sealed shaft assembly comprising a shaft member, a housing member for said shaft member, a wear sleeve mounted in said housing, a connection between one of said members and said sleeve, a packing gland mounted in sealing contact with said sleeve and the other of said members, said sleeve at both ends of said sleeve extending beyond said packing gland, a space between said wear sleeve and said one member said space being sealed at both ends of said sleeve by a flexible boot connecting said one member to said sleeve.

2. The assembly of claim 1 in which said boots, positioned at each end of said sleeve, enclose the space between said sleeve and said one member.

3. A progressing cavity fluid motor which includes a rotor, a stator, and a stator housing, tubular shaft means connected to said rotor, a housing for said shaft means, a fluid inlet into said stator and a fluid outlet from said stator, a fluid passageway from said stator outlet and into said tubular shaft means, radial and thrust bearings mounted in said shaft housing between said shaft housing and said shaft, the improvement which comprises a sleeve mounted at one end thereof on said shaft for rotation with said shaft, a flexible boot connecting each end of the said sleeve to said shaft and forming an enclosed space between said sleeve and said shaft, a packing between said sleeve and said housing, said packing being in sealing contact with said sleeve.

4. A sealed shaft assembly comprising a shaft, a housing for said shaft, a wear sleeve mounted on said shaft, a flexible boot at each end of said wear sleeve connected to said shaft and said wear sleeve and forming an enclosed space between said wear sleeve and said shaft, a sleeve between said sleeve and said housing in sealing contact with said gland, said sleeve extending above and below said gland, means on said shaft and sleeve for rotation of said sleeve with said shaft.

5. In the assembly of claim 4, a bearing mounted in said housing between said shaft and said housing, a fluid inlet to said housing, said gland and sleeve positoned in said housing between said inlet and said bearing.

6. A sealed bearing assembly for a rotating shaft subject to cyclic forces acting transversely to the axis of said shaft comprising a housing, a shaft extending beyond an end of said housing, a fluid inlet to said housing, a bearing between said shaft and said housing, a second bearing in said housing between said shaft and said housing, a wear sleeve and seal assembly between said fluid inlet and said first-named bearing, a flexible boot connected to each end of said sleeve and to said shaft forming an enclosed space between said sleeve and said shaft, a packing gland in sealing contact with the wear sleeve and said housing.

7. A fluid motor which includes a rotor, a stator, and a stator housing, a shaft connected to said rotor for rotation by said rotor, a housing for said shaft connected to said stator housing, a fluid inlet into said stator housing, and a fluid outlet from said stator into said shaft housing, thrust bearings mounted in said shaft housing between said shaft housing and said shaft, seal mounted in said shaft housing between said thrust bearing and said shaft means, a sleeve mounted at one end thereof on said shaft for rotation with said shaft, a flexible boot connected at each end of said sleeve to said shaft forming an enclosed space between said shaft and said sleeve, a seal between said sleeve and said housing.

8. A sealed shaft assembly comprising a shaft member, a housing member for said shaft, a wear sleeve mounted in said housing and connected to said shaft at one end of said sleeve, a seal between said wear sleeve and one of said members, a flexible boot connected to the other end of said sleeve and said shaft.

9. In the assembly of claim 8, a bearing mounted in said housing between said shaft and said housing, a fluid inlet to said housing, said seals and wear sleeve positioned in said housing between said inlet and said bearing.

10. The assembly of claim 9 in which said bearing is a thrust bearing.

11. A progressing cavity fluid motor which includes a rotor, a stator, and a stator housing, tubular shaft means connected to said rotor, a shaft housing for said shaft means, a fluid inlet into said stator and a fluid outlet from said stator, a fluid passageway from said stator outlet and into said tubular shaft means, radial and thrust bearings mounted in said shaft housing between said shaft housing and said shaft, the improvement which comprises a seal mounted in said shaft housing between said thrust bearings and said fluid outlet, a sleeve mounted at one end thereof on said shaft for rotation with said shaft, said seal positioned between said sleeve and said shaft, a flexible boot connected to the other end of said sleeve and to said shaft.

12. A sealed bearing assembly for a rotating shaft subject to cyclic forces acting transversely to the axis of said shaft comprising a housing, a shaft extending beyond an end of said housing, a fluid inlet to said housing, a bearing between said shaft and said housing, a second bearing in said housing between said shaft and said housing, a wear sleeve and seal assembly between said fluid inlet and said first-named bearing, said wear sleeve and seal assembly comprising a packing gland in sealing contact with the wear sleeve and said housing, said wear sleeve connected at one end to said shaft, a flexible sleeve connected to said boot and said shaft at the other end of said sleeve.

* * * * *

PO-1050
(5/69)

UNITED STATES PATENT OFFICE
CERTIFICATE OF CORRECTION

Patent No. 3,912,425                Dated October 14, 1975

Inventor(s) JOHN E. TSCHIRKY; GARY MONROE CRASE

It is certified that error appears in the above-identified patent and that said Letters Patent are hereby corrected as shown below:

Col. 3, line 42 - After "fitting" change "37" to - 35 - .

Col. 3, line 49 - Correct the spelling of - enclosure - .

Col. 5, line 58 - Correct the spelling of - sleeve - .

Col. 7, line 10 - After ", a" change "sleeve" to - gland - .

Col. 7, line 11 - After "said" change "gland" to - sleeve - .

Signed and Sealed this twenty-fourth Day of February 1976

[SEAL]

Attest:

RUTH C. MASON
*Attesting Officer*

C. MARSHALL DANN
*Commissioner of Patents and Trademarks*